UNITED STATES PATENT OFFICE.

HANS DUDEN, OF INDIANAPOLIS, INDIANA.

PROCESS OF MAKING FERTILIZERS.

SPECIFICATION forming part of Letters Patent No. 609,797, dated August 30, 1898.

Application filed November 12, 1897. Serial No. 658,322. (No specimens.)

*To all whom it may concern:*

Be it known that I, HANS DUDEN, a resident of Indianapolis, in the county of Marion and State of Indiana, have invented certain new and useful Improvements in the Manufacture of Fertilizers; and I do hereby declare the following to be a full, clear, and exact description of the invention, such as will enable others skilled in the art to which it appertains to make and use the same.

My invention relates to an improvement in the manufacture of fertilizers.

Available nitrogen in the soil is offered to plants by the putrefaction of animal matters. These are slowly broken up in presence of oxygen, and nitrates are formed. The microorganisms of nitrification are assisted in their growth by a sufficient amount of oxygen, and to simplify the work of nitrification organisms I propose to oxidize the plant-food with an electric current.

It is the object of this invention to manufacture fertilizers so as to simplify the work of nitrification organisms.

With this object in view the invention consists in certain combinations of ingredients and the manner of combining and treating them in the manufacture, as hereinafter set forth, and pointed out in the claims.

In proceeding to carry my improved process into effect tank-water of the rendering-tanks of slaughter-houses is concentrated in vacuum-evaporators (30° Baumé) and the concentrated product is pumped into a jacketed mixer. Albuminous substances, as blood-serum and the like, are also concentrated to about 15° Baumé in a vacuum-evaporator at twenty-eight inches vacuum, or thereabout. The coagulating power of the serum should be entirely preserved. Four volumes of the tank-water product is mixed with one volume of the concentrated blood-serum at a temperature preferably below 50° Celsius. The mixture is now subjected to the action of steam, and at the same time an electric current of from seventy-five to one hundred and twenty volts is passed through the hot mixture. If the mixture has an alkaline reaction, the same will be acidified with sulfuric acid, for which purpose one pound of sulfuric acid to one ton of the mixture is usually sufficient. As soon as the boiling-point is reached oxidation sets in vigorously. Having boiled for about fifteen or twenty minutes, the mixture will be drawn into a cooling-pan, when it will be placed in the drying-oven, by which it will be heated to about 280° Fahrenheit, which has been found to be a suitable temperature for drying. Grinding and screening will bring the product into a suitable condition for the plants. The resulting material contains from seventeen to nineteen per cent. of ammonia as against twelve to fourteen per cent. obtained by the processes heretofore practiced. It has the brittleness of dried blood and loses the deliquescent character of tank-water products.

The purpose of oxidation is to destroy the stickiness and non-drying quality of tank-water products. When electricity is acting on acidulated tank-water, the oxygen of the anode acts in the *status nascendi* vigorously on the heated mixture, oxidizing thereby and bringing about a number of important changes, one of which is the splitting of the glycerin bodies into formic, acetic, and oxalic acid, trioxymethlene, acrolein, and acrylic and proprionic acid, not one of which products has the non-drying properties of glycerin.

Having fully described my improvement, what I claim as new, and desire to secure by Letters Patent, is—

1. The process of making fertilizer consisting in mixing albuminous substance and tank-water products and applying thereto an electric current.

2. The process of making fertilizer consisting in mixing albuminous substance with the tank-water products, heating the mixture and passing an electric current through the mixture.

3. The herein-described process consisting in mixing albuminous substance and tank-water products and simultaneously subjecting the mixture to steam and electricity, substantially as set forth.

4. The herein-described process consisting in mixing albuminous substance and tank-water products and oxidizing the mixture.

5. The herein-described process, consisting in concentrating tank-water, concentrating blood-serum and preserving the coagulating power, mixing the tank-water product and the concentrated blood-serum in substantially the proportions stated, then subjecting the mixture to the action of steam and electricity and finally drying, grinding and screening the product.

In testimony whereof I have signed this specification in the presence of two subscribing witnesses.

HANS DUDEN.

Witnesses:
ELLIOTT W. DAVIS,
GEO. A. KIRKWOOD.